US006854706B2

(12) United States Patent
Sato et al.

(10) Patent No.: US 6,854,706 B2
(45) Date of Patent: Feb. 15, 2005

(54) ELECTROMAGNETIC VALVE

(75) Inventors: Hideharu Sato, Tsukuba-gun (JP);
Yoshio Aso, Tsukuba-gun (JP); Shinichi Yoshimura, Tsukuba-gun (JP); Takumi Matsumoto, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 73 days.

(21) Appl. No.: 10/223,373

(22) Filed: Aug. 20, 2002

(65) Prior Publication Data
US 2003/0042453 A1 Mar. 6, 2003

(30) Foreign Application Priority Data

Sep. 4, 2001 (JP) ........................................ 2001-267479

(51) Int. Cl.[7] .............................................. F16K 31/00
(52) U.S. Cl. .................................. 251/129.15; 251/904
(58) Field of Search ........................ 251/129.15, 129.18, 251/335.1, 366, 317, 904; 24/625, 618; 137/315.03

(56) References Cited

U.S. PATENT DOCUMENTS

| | | | |
|---|---|---|---|
| 3,747,623 A | | 7/1973 | Greenwood et al. |
| 4,254,938 A | * | 3/1981 | Inada et al. .................. 251/367 |
| 5,441,233 A | | 8/1995 | Asou et al. |
| 5,517,096 A | * | 5/1996 | Shtarkman et al. .......... 318/434 |
| 5,838,534 A | * | 11/1998 | Yang ........................ 24/113 R |
| 5,852,854 A | * | 12/1998 | Pierrot et al. .................. 24/625 |
| 6,213,445 B1 | * | 4/2001 | Sato et al. ............... 251/129.15 |
| 6,542,059 B2 | * | 4/2003 | Sato et al. ............... 251/129.15 |
| 6,684,901 B1 | * | 2/2004 | Cahill et al. ............ 137/315.03 |

FOREIGN PATENT DOCUMENTS

EP    1 284 383    2/2003

\* cited by examiner

Primary Examiner—J. Casimer Jacyna
(74) Attorney, Agent, or Firm—Oblon, Spivak, McClelland, Maier & Neustadt, P.C.

(57) ABSTRACT

To provide an electromagnetic valve where an end cover can easily be fitted into a valve hole, and a valve body can be small-sized. In an electromagnetic valve, an end cover 30 for closing a hole end 21e of a valve hole 21a formed in a valve body 21 is constituted by a lid plate 31, a plurality of arm pieces 31a provided so as to extend from a peripheral edge of the lid plate 31, engagement resilient pieces 32 provided on a side of an inner face of the lid plate 31 from the arm pieces 31a in a standing manner, respectively, and which are formed at their distal end portions with engagement claws 33 expanding in a taper shape, and a fitting cylindrical portion 34 which is provided in a projecting manner on an inner face of the lid plate 31 such that its height from the inner face is lower than those of the engagement resilient pieces 32 and which is disposed on its outer periphery with a seal member 25, the fitting cylindrical portion 34 is tightly fitted into the hole end 21e opened in the valve body 21, and the engagement claws 33 are engaged with stepped portions 21c in engagement grooves 21b provided in a recessed manner in the vicinity of the hole end 21e of the valve body 21.

2 Claims, 3 Drawing Sheets

PRIOR ART

ELECTROMAGNETIC VALVE

TECHNICAL FIELD

The present invention relates to an electromagnetic valve comprising a solenoid portion and a valve portion, and in particular to improvement of an end cover which closes a valve hole of a valve portion.

PRIOR ART

Conventionally, as shown in FIG. 3, as an electromagnetic valve of this kind, one constituted by a bobbin 2 on which a coil 1 has been wound, a fixed iron core 3 which is fitted into a central hole of the bobbin 2, a movable iron core 4 which is slidably inserted in the bobbin 2, valve seats 5a, 5b which are provided in a communication path which causes a plurality of ports (not shown) provided in a valve body 5 to communicate with one another, and valve members 6a, 6b which are driven by the movable iron core 4 to close the valve seats 5a, 5b has been known. In this electromagnetic valve, a valve hole 7 for accommodating the valve member 6b is bored in the valve body 5, and an end cover 9 which closed the opening portion and which serves as a valve seat for a valve spring 8 biasing the valve member 6b inserted into the valve body 5 in one direction is fitted in an opening portion of the valve hole 7.

Then, the end cover 9 comprises a cylindrical base body portion 9a with a bottom, a plurality of engagement pieces 9b which are provided in a standing manner so as to expand from an outer peripheral face of the base body portion 9a in a direction reverse to a fitting direction of the end cover 9 and which are provided at their distal ends with claw portions 9c, and a seal member 10 which is disposed nearer to an outer periphery on the side of a distal end of the base body portion 9a than the engagement pieces 9b. When the end cover 9 is fitted into the valve hole 7, the valve hole 7 is tightly closed by the seal member 10, and the claw portions 9c of the engagements pieces 9b are engaged with the stepped portion 7a formed in the valve hole 7, so that the end cover 9 is prevented from coming off from the valve hole 7.

Now, in the end cover 9 of the electromagnetic valve described above, since the engagement pieces 9b are provided so as to expand from the outer peripheral face of the cylindrical base body portion 9a in a direction reverse to the fitting direction of the end cover 9, the seal member 10 can not be disposed nearer to a bottom of the base body portion 9a than the engagement pieces 9b and they must be disposed on the distal end side of the base body portion 9a. Therefore, the entire of the end cover 9 becomes long, which prevents small-sizing of the electromagnetic valve. Also, since the engagement pieces 9b are bent along an outer peripheral face of the base body portion 9a, when the engagement pieces are shortened as far as possible in order to small-size the valve body 5, they have relatively high rigidities against an external force applied from a side direction thereof so that they become difficult to flex. Accordingly, when the end cover 9 is fitted into the valve hole 7, a relatively strong force is required.

DISCLOSURE OF THE INVENTION

The present invention has been made in view of the above-described problem, and an object thereof is to provide an electromagnetic valve where a valve body can be small-sized and fitting into a valve hole can easily be performed.

In order to solve the above problem, an electromagnetic valve comprising a valve portion constituted such that, in an interior of a valve body provided with a plurality of ports, a valve hole communicating with the respective ports is formed so as to be opened to an end face of the valve body, a valve member for switching flow paths among the respective ports is accommodated in the valve hole, and an opening portion of the valve hole is closed by an end cover; and a solenoid portion which drives the valve member, characterized in that the valve body comprises two engagement grooves formed so as to extend in an axial direction of the valve hole on both sides of the opening portion of the valve hole and stepped portions formed inside the respective engagement grooves; and the end cover comprises a lid plate which covers the opening portion of the valve hole, a cylindrical portion which is provided on an inner face of the lid plate to be fitted in the valve hole in an air-tight manner, two arm pieces which extend from both side faces of the lid plate transversely, engagement resilient pieces which extend from the respective arm pieces along the engagement grooves, and engagement claws which are formed at distal ends of the engagement resilient pieces to be engaged with the stepped portions of the engagement grooves.

A movable orifice member provided with an orifice communicating with one of the plurality of ports is accommodated in the valve hole movably in directions of approaching to/separating from the valve member, and a portion of the movable orifice member is supported slidably to the cylindrical portion in the end cover.

BRIEF DESCRIPTION OF THE INVENTION

DETAILED DESCRIPTION

One embodiment of the present invention will be explained below in detail with reference to the drawings.

Figure 1:
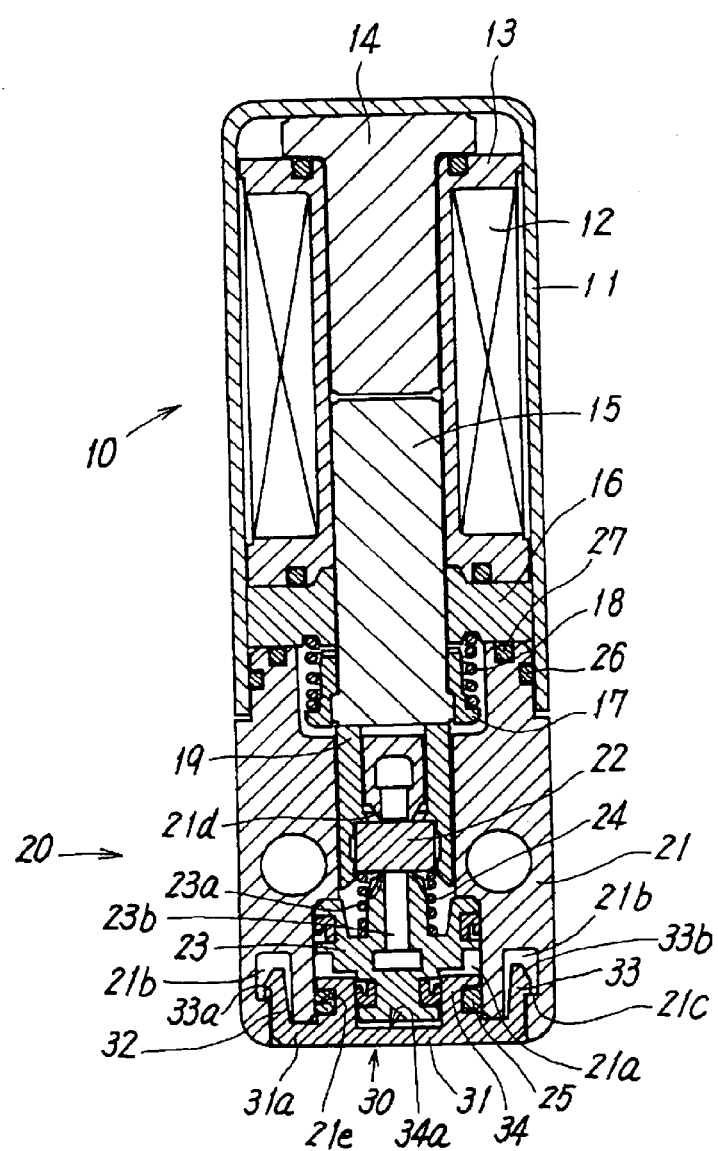
FIG. 1 is a longitudinal sectional view showing one embodiment of an electromagnetic valve according to the present invention.

An electromagnetic valve shown in FIG. 1 comprises a solenoid portion 10 and a valve portion 20. The solenoid portion 10 comprises a bobbin 13 on which a coil 12 has been wound, a magnetic case 11 which is provided around the coil 12 and which comprises a side wall having a generally rectangular sectional shape, an end wall formed on one end of the side wall integrally therewith and an opening formed on the other end thereof, a magnetic plate 16 which is arranged on the opening side of he magnetic case 11 in the bobbin 13, a column-shaped movable iron core 15 whose section is generally elliptic or oval and whose one end side is slidably inserted into a central hole extending the magnetic plate 16 and the bobbin 13 from the side of the magnetic plate 16, and a column-shaped fixed iron core 14 whose section is generally elliptic or oval, which is disposed on the end wall of the magnetic case 11 to be inserted in the central hole of the bobbin 13 and which attracts the movable iron core 15 by magnetic force. Then, by fixing an outer periphery of the magnetic plate 16 to an inner face of the side wall of the magnetic case 11 by such means as welding or the like, the bobbin 13 and the fixed iron core 14 are fixed inside the magnetic case 11. Thereby, a magnetic path is formed around the coil 12 of the bobbin 13.

Also, a stopper 17 which is made from synthetic resin and which abuts on the magnetic plate 16 when the movable iron core 15 is attracted to the fixed iron core 14 is pressure-fitted into the other end side of the movable iron core 15, and a return spring 18 is confined between the stopper 17 and the magnetic plate 16.

In the solenoid portion, when the coil 12 is put in de-excited state, the movable iron core 15 is separated from the fixed iron core 14 by the biasing force of the return spring 18 to move in a direction of pushing a push rod 19 of the valve portion 20 described later.

On the other hand, when the coil 12 is excited, the fixed iron core 14 attracts the movable iron core 15 by the magnetic force against the biasing force of the return spring 18 so that the pushing force of the movable iron core 15 to the push rod 19 is released.

Figure 2:
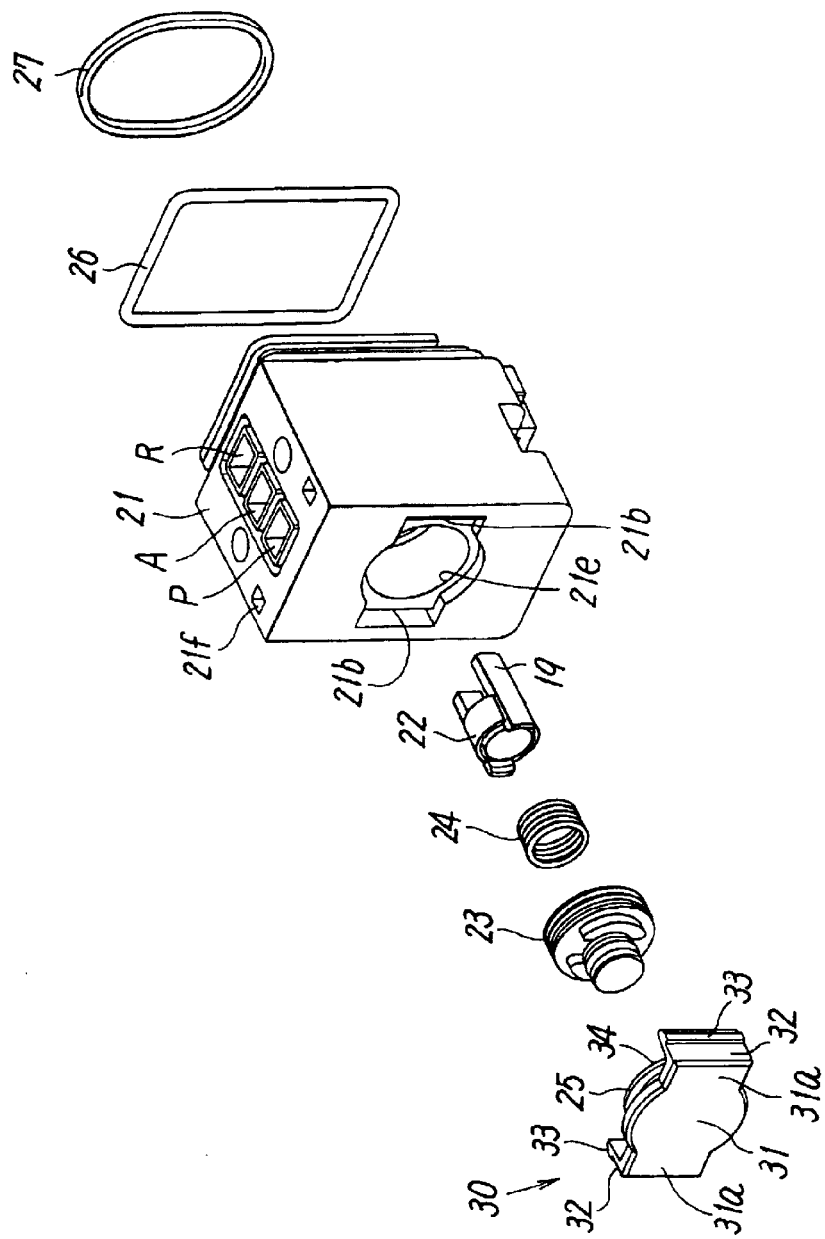
FIG. 2 is an exploded perspective view of a valve portion in the electromagnetic valve in FIG. 1.
Figure 3:
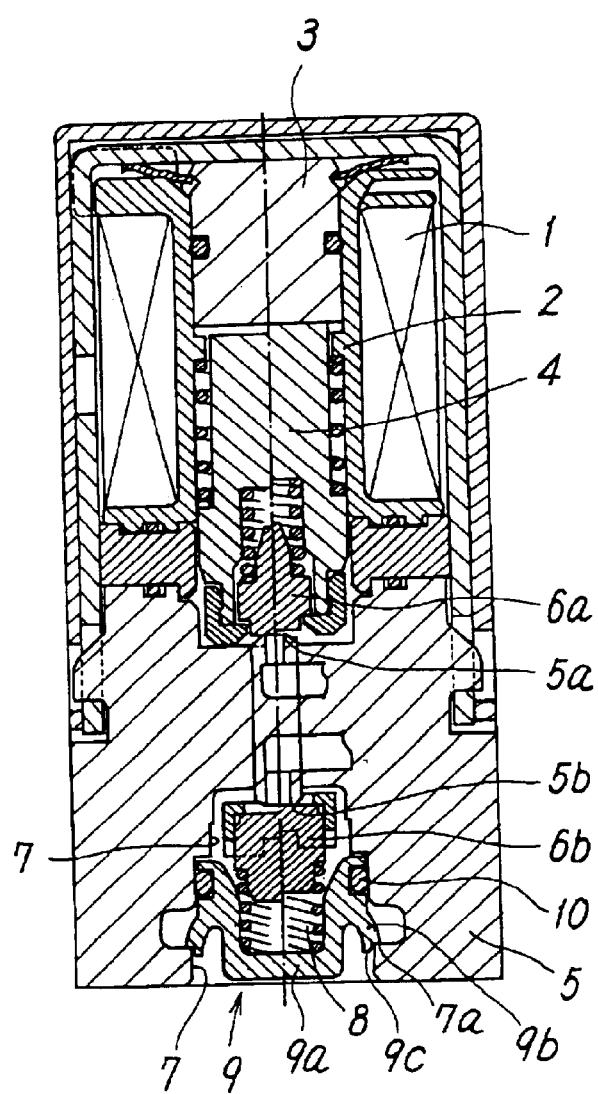
FIG. 3 is a longitudinal sectional view of a conventional electromagnetic valve.

Also, as also understood from FIG. 2, the valve portion 20 comprises a valve body 21 whose transverse face is generally rectangular and which has an input port P, an output port A, a discharge port R and a valve hole 21a which communicate with these ports, a movable orifice member 23 and a poppet valve 21 which are received in the valve hole 21a, and the push rod 19 which protrudes in one end of the valve portion 20 in a state where it is coupled to the poppet valve 22 and which is pushed by the movable iron core 15.

The movable orifice member 23 comprises a supply valve seat 23a which is opened in the valve hole 21a to be opened/closed by the poppet valve 22, and a flow path 23b which causes the supply valve seat 23a and the input port A to communicate with each other, and it is provided within the valve hole 21a slidably in a direction of the poppet valve 22, or in a direction in which the supply valve seat 23a seats on the poppet valve 22.

The poppet valve 22 is arranged within the valve hole 21a movably between a discharge valve seat 21d which causes the discharge port R to communicate with the valve hole 21a and the supply valve seat 23a, and it opens/closes both the valve seats 21d, 23a at a time of excitation to the coil 12 of the solenoid portion 10. Incidentally, a poppet spring 24 is confined between the movable orifice member 23 and the poppet valve 22. Also, a hole end 21e which is opened to an end face of the valve body 21 for inserting the movable orifice member 23, the poppet valve 22 and the like in the valve hole 21a is tightly closed by an end cover 30 attached around it with a seal member 25.

Then, the solenoid portion 10 and the valve portion 20 are coupled to each other by fitting one end of the valve body 21 in the valve portion 20 from which the push rod 19 protrudes into an opening of the magnetic case 1 in the solenoid portion 10 via seal members 26 and 27.

In the electromagnetic valve obtained by coupling the solenoid portion 10 and the valve portion 20 in this manner, in case that the coil 12 is put in an de-excited state, the movable iron core 15 separates from the fixed iron core 14 to push the poppet valve 22 to the supply valve seat 23a of the movable orifice member 23 via the push rod 19. Also, when the coil 12 is excited, the movable iron core 15 is attracted to the fixed iron core 14, so that pushing of the push rod 19 effected by the movable iron core 15 is released, and the poppet valve 22 is separated from the supply valve seat 23a and is seated on the discharge valve seat 21d by the biasing force of the poppet spring 24.

Thereby, the input port P, the output port A, and the discharge port R are put in communication with each other or are put in a disconnected state from each other so that switching is performed.

The end cover 30 is constituted by a lid plate 31 which closes the end portion of the valve hole, arm pieces 31a which are provided so as to extend integrally from a peripheral edge portion of the lid plate 31 in both left and right directions and to be positioned on the same face as the lid plate 31, engagement resilient pieces 32 which are formed vertically and integrally at end portions of the arm pieces 31a to extend towards an inner face of the lid plate 31, and a cylindrical fitting cylindrical portion 34 which is formed integrally on an inner face of the lid plate 31 to have a seal member 25 on the outer periphery and which is fitted into the hole end 21e of the valve hole 21a. The engagement resilient piece 32 is integrally formed with an engagement claw 33, and the engagement claw is provided with a taper portion 33b expanding outward of the end cover 30 and a corner portion 33a engaged with a stepped portion 21c of an engagement groove 21b provided in the valve body 21.

Here, in the fitting cylindrical portion 34, its height from an inner face of the lid plate 31 is made lower than the engagement resilient piece 32. Also, a recessed portion 34a is defined by the fitting cylindrical portion 34 and the lid plate 31, one end portion of the movable orifice member 23 is slidably fitted into the recessed portion, and an unillustrated ventilation hole which causes the recessed portion 34a and the outside of the valve member 20 to communicate with each other on the end cover 30.

The poppet valve 22 constitutes a flow path opening/closing mechanism which opens/closes the supply valve seat 23a and the discharge valve seat 21d alternately together with the movable orifice member 23 displaced in the valve hole and the like, and this flow path opening/closing mechanism is not limited to the illustrated constitution. In particular, the movable orifice member 23 can be provided fixedly inside the valve hole or to the end cover 30. Then, when such a constitution is employed that a recessed portion 34a is provided at a center of the fitting cylindrical portion 34 and one portion of the flow path opening/closing mechanism is fitted into the recessed portion, the valve body 21 can be small-sized correspondingly.

On the other hand, engagement grooves 21b in which the engagement resilient pieces 32 are inserted for engagement are provided on both left and right outside positions of the hole end 21e in the valve body 21, and stepped portions 21c which are engaged with the engagement claws 33 are formed on side walls outside of the engagement grooves 21b.

Incidentally, the stepped portions 21c are formed by providing the engagement grooves 21b in a recessed manner on both sides of the opening portion of the hole end 21e in the valve body 21 and boring a through hole 21f intersecting the engagement grooves 21b from the outer face of the valve body 21.

Then, when the taper portions 33b of the engagement claws 33 are pressed on end edges of the outer walls of the engagement grooves 21b and the end cover 30 is pushed in a direction in which it is fitted to the hole end 21e of the valve hole, the arm pieces 31a and the engagement resilient pieces 32 of the end cover 30 are flexed inwardly and the engagement claws 33 ride on the outer walls of the engagement grooves 21b. Further, when the end cover is further pressed to fit the fitting cylindrical portion 34 into the hole end 21e completely, the engagement resilient pieces 32 are opened resiliently so that the stepped portions 21c of the engagement grooves 21b and the corner portions 33a of the engagement claws 33 are engaged with each other. Thereby, the hole end 21e is closed by the end cover 30. Simultaneously, one end portion of the movable orifice member 23 is fitted into the recessed portion 34a.

Incidentally, in the above-described embodiment, the two arm portions 31a extend from the lid plate 31 of the end cover 30, but any number of the arm portions may be provided as far as the number is plural. Also, the engagement claws 33 are formed on the outsides of the engagement resilient pieces 32, but they may be formed on insides thereof, of course.

As understood from the above explanation, according to the present invention, since the end cover is constituted by a lid plate, a plurality of arm pieces which are provided to extend from a peripheral edge of the lid plate, engagement resilient pieces which are respectively provided on an inner face of the lid plate from the arm pieces and which are formed at their distal ends with engagement claws expanding in a tape shape, and a fitting cylindrical portion which is provided on an inner face of the lid plate in a projecting manner such that its height from the inner face is lower than those of the engagement resilient pieces and which is disposed on its outer periphery with a seal member 25, a seal member can be disposed at a position nearer to the lid plate than the engagement claws of the engagement resilient pieces, so that the entire length of the end cover can be shortened and the electromagnetic valve is small-sized as compared with the conventional one. Also, since the arm pieces and the engagement resilient pieces are easy to flex when the valve hole is closed by the end cover, the engagement claws can be caused to engage the stepped portions formed in the engagement grooves of the valve body with a force smaller than that in the conventional case.

What is claimed is:

1. An electromagnetic valve comprising:

a valve portion including, in an interior of a valve body provided with a plurality of ports, a valve hole communicating with the respective ports formed so as to be opened to an end face of the valve body, a valve member configured to switch flow paths among the respective ports accommodated in the valve hole, and an opening portion of the valve hole closed by an end cover; and a solenoid portion configured to drive the valve member, wherein the valve body comprises two engagement grooves formed so as to extend in an axial direction of the valve hole on both sides of the opening portion of the valve hole and stepped portions formed inside the respective engagement grooves; and the end cover comprises a lid plate which covers the opening portion of the valve hole, a cylindrical portion which is provided on an inner face of the lid plate configured to be fitted in the valve hole in an air-tight manner, two arm pieces which extend from both side faces of the lid plate transversely, engagement resilient pieces which extend from the respective arm pieces along the engagement grooves, and engagement claws which are formed at distal ends of the engagement resilient pieces configured to be engaged with the stepped portions of the engagement grooves.

2. The electromagnetic valve according to claim 1, further comprising:

a movable orifice member provided with an orifice communicating with one of the plurality of ports accommodated in the valve hole movably in directions of approaching to and separating from the valve member, a portion of the movable orifice member supported slidably to the cylindrical portion in the end cover.

* * * * *